H. B. Knowles,
Treadle.
Nº 25,652.   Patented Oct. 4, 1859.
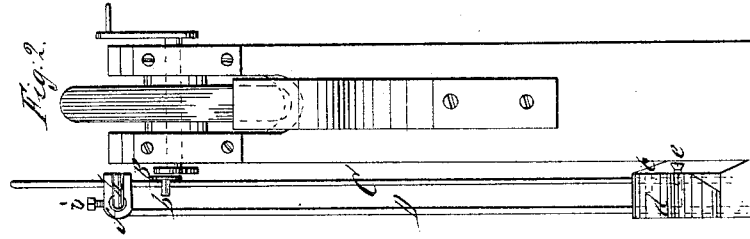
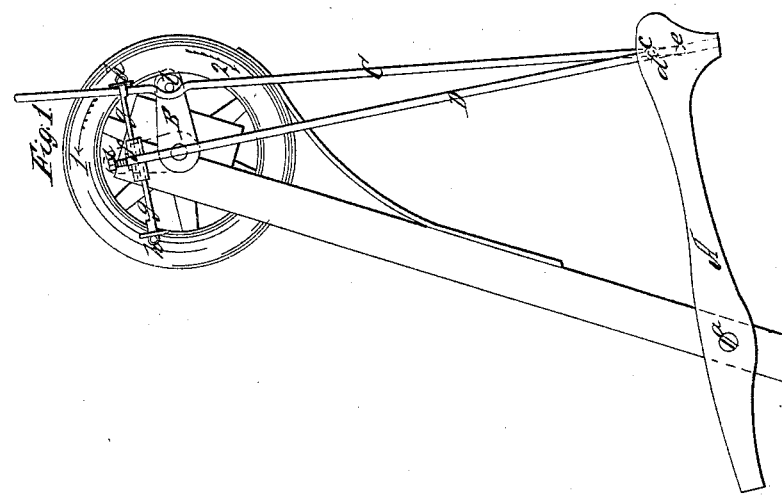
Witnesses:
Benj. W. Bowen
Lewis Holmes
Inventor:
H. B. Knowles

UNITED STATES PATENT OFFICE.

H. B. KNOWLES, OF PROVIDENCE, RHODE ISLAND.

IMPROVED ATTACHMENT TO TREADLES OF SEWING-MACHINES.

Specification forming part of Letters Patent No. 25,652, dated October 4, 1859.

*To all whom it may concern:*

Be it known that I, H. B. KNOWLES, of Providence, in the county of Providence and State of Rhode Island, have invented a new and Improved Attachment to Treadles of Sewing-Machines, &c.; and I do hereby declare that the following is a full, clear, and exact description of the same, reference being had to the accompanying drawings, forming a part of this specification, in which—

Figure 1 represents a side elevation of my attachment. Fig. 2 is a front elevation of the same.

Similar letters of reference in both views indicate corresponding parts.

The nature of my invention consists in the employment of a yielding adjustable rod having a cross-head with hooks at its upper end, in combination with a shackle-bar, crank-shaft, and treadle, substantially in the manner hereinafter specified. In this arrangement the spring-rod by the aid of its cross-head and hooks commences to act soon after the crank has reached its first or third quarter of a revolution, and as it passes from a quarter to a conjunction the power through the spring-rod increases as the power through the connecting rod or pin decreases, until it reaches its conjunction, when, if left to itself, the spring will carry it forward until it (the spring) finds a state of rest, at which point the crank is again acted upon by the connecting-rod, and thus is produced a more equal application of the power administered to the treadles through the whole revolution of the crank, by which means the crank may be driven slowly without depending so much upon the momentum of the balance-wheel to equalize it, and therefore the balance-wheel might be much reduced in weight with good results, and the treadle still have control of the crank in all parts of its circuit; and, besides this, if the power is applied so as to turn the machine in the wrong direction it is resisted by the spring and its attachments, and the crank cannot be made to pass the dead-centers, except by momentum, whereas if the power is applied in the right direction it moves the crank forward with regularity and ease. Thus it will be seen that the object attained by my invention is threefold—first, to have the crank of a sewing or any other machine which may be operated by a treadle, when the machine is stopped, remain in a position to be started by the foot without applying the hand thereto, leaving the operator perfectly free to manage the fabric; second, to prevent a liability or possibility of the machine being started in the wrong direction; and, third, to enable the operator to drive the machine as slowly as desired without a liability of its halting near its conjunctions, and to equalize power applied to the treadle throughout the revolution of the crank.

To enable those skilled in the art to fully understand, make, and use my invention, I will proceed to describe its construction and operation.

A represents the treadle of a sewing-machine, or of some other machine which is liable to be injured by being turned in the wrong direction, and where it is desirable to have the crank always in such a position that the machine can be started without the aid of the hands. This treadle turns on a pivot, *a*, and it connects with the wrist-pin *b* of the crank B by means of the shackle-bar C, which is secured to the front end of the treadle by means of a pivot, *c*, and which may be made so as to extend beyond the wrist-pin *b*, as clearly represented in the drawings. The front end of the treadle is provided with a socket, *d*, which serves to retain a rod, D, by means of a set-screw, *e*, and the socket *d* is so arranged that the rod D is at right angles with the treadle, and secured to the upper end of this rod is a tube, *f*, which serves to retain two arms, *g*, the ends of which are bent over at right angles, so as to form hooks *h*, which strike against the shackle-bar C at the proper moment in order to carry the crank over the dead-point. The arms *g* are adjusted in the tube *f* by means of a set-screw, *i*, and the hooks *h* may be brought to bear on the shackle-bar farther from or nearer to the wrist-pin *b* by raising or lowering the rod D in the socket *d*. The rod D is so arranged that it acts as a spring, so that the hooks *h* yield as the angle between the shackle-bar and between the rod D increases, and that a certain force is exerted on the former as the crank approaches its centers, and the hooks *h* are covered with some soft and elastic material, so as to prevent blows or noise when they come in contact with the shackle-bar.

The operation is as follows: In order to start the machine from the position represented in Fig. 1, the foot is placed on the treadle, and by depressing the heel the crank moves in the direction of arrow 1, and as the angle between the shackle-bar and between the rod D increases as the crank approaches its center one of the hooks $h$ exerts a certain pressure on the shackle-bar, sufficient to carry the crank beyond the dead-point and to a position from which the machine can again be started by depressing the toes. It will be noticed that when the machine is turned in the right direction, which is indicated by arrow 1, the hooks $h$ begin to act on the shackle-bar as soon as the crank has passed its half-center, when it is in the most favorable position for the action of the shackle-bar, so that it can be forced against the action of the elasticity exerted by the rod D; and this elastic force may be considered as the resultant of two component forces, one of which acts in a direction at right angles to the shackle-bar, while the other one acts in the direction of the shackle-bar itself, and it is this latter component which opposes the motion of the crank in the direction of arrow 1; but this component is growing smaller and smaller as the crank approaches its centers, and it is zero when the arm $g$ by which the force is exerted is at right angles with the shackle-bar, which is the case before the crank reaches its centers, so that the full force exerted by the elasticity of the rod D serves to carry the crank over its dead-points. On the other hand, if an attempt be made to turn the machine in the wrong direction, (indicated by arrows 2,) the elasticity of the rod D opposes the motion of the crank as it approaches its centers, and the crank therefore cannot be brought to pass its dead-points without an extra exertion of the foot, or by the aid of the hands.

The power exerted by the rod D on the shackle-bar may be increased by raising it in the socket $d$, or by diminishing the length of the arms $g$, and it is not absolutely necessary to extend the shackle-bar beyond the wrist-pin $b$; but I find it more convenient to apply the force of the spring D in this manner, as the hooks $h$ are thus less liable to interfere with the action of the crank.

Instead of making the rod D elastic, it might be made rigid, and the springs could be applied to the arms $g$, so as to make them exert a force on the shackle-bar similar to the force exerted by the elastic rod D.

I am aware that a device for performing one of the functions ascribed to my invention was patented by F. S. Stoddard in May, 1859. Therefore I do not claim, broadly, the prevention of the turning of a sewing-machine crank-shaft in the wrong direction; but What I do claim as my invention, and desire to secure by Letters Patent, is—

The employment of a yielding adjustable rod having a cross-head with hooks at its upper end, in combination with a shackle-bar, crank-shaft, and treadle, substantially as and for the purposes set forth.

H. B. KNOWLES.

Witnesses:
BENJ. W. BOWEN,
LEWIS HOLMES.